(12) United States Patent
MacLaren et al.

(10) Patent No.: US 11,594,885 B2
(45) Date of Patent: Feb. 28, 2023

(54) PHOTOVOLTAIC GRID CAPACITY SENSOR

(71) Applicant: Massachusetts Institute of Technology, Cambridge, MA (US)

(72) Inventors: Brice MacLaren, Wellesley, MA (US); James Macomber, North Grafton, MA (US); Megan Richardson, Cohasset, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 151 days.

(21) Appl. No.: 17/185,248

(22) Filed: Feb. 25, 2021

(65) Prior Publication Data

US 2021/0281069 A1 Sep. 9, 2021

Related U.S. Application Data

(60) Provisional application No. 62/984,398, filed on Mar. 3, 2020.

(51) Int. Cl.
*H02J 3/00* (2006.01)
*H02J 7/00* (2006.01)

(52) U.S. Cl.
CPC ............ *H02J 3/003* (2020.01); *H02J 7/0031* (2013.01); *H02J 2207/30* (2020.01); *H02J 2300/24* (2020.01); *H02J 2310/10* (2020.01)

(58) Field of Classification Search
CPC ...... H02J 3/003; H02J 7/0031; H02J 2207/30; H02J 2300/24; H02J 2310/10;
(Continued)

(56) References Cited

U.S. PATENT DOCUMENTS 5,583,440 A * 12/1996 Bisher .................. G01R 31/40
324/426
2010/0114396 A1 5/2010 Benson et al.
(Continued)

OTHER PUBLICATIONS

Bartlett, "New Study Estimates 4 Million Deaths from Household Cooking Smoke Each Year;" Downloaded from https://www.cleancookingalliance.org/about/news/12-13-2012-new-study-estimates-4-million-deaths-from-household-cooking-smoke-each-year.html; Dec. 13, 2012; 2 pages.
(Continued)

*Primary Examiner* — Ziaul Karim
(74) *Attorney, Agent, or Firm* — Daly, Crowley, Mofford & Durkee, LLP

(57) ABSTRACT

In one aspect, a method to determine a capacity of a microgrid includes applying a current test load to the microgrid and measuring a current through an energy storage device, the current indicating a charging status of the energy storage device based on a current load being applied to the microgrid through activated power outlets being served by the microgrid and the current test load, the energy storage device being integrated with the microgrid. The method also includes, responsive to a determination that the measured current based on the current load being applied to the microgrid and the current test load indicates that the energy storage device is discharging, determining the capacity of the microgrid, wherein the capacity is the current load being applied to the microgrid through activated power outlets and a test load applied to the microgrid immediately preceding the current test load.

14 Claims, 5 Drawing Sheets

(58) Field of Classification Search
CPC ............... H02J 3/0012; H02J 2203/20; H02J 13/00002; H02J 3/32; Y02B 90/20; Y02E 10/56; Y02E 40/70; Y02E 60/00; Y02E 70/30; Y02P 80/20; Y04S 10/123; Y04S 10/30; Y04S 20/12; Y04S 40/20
See application file for complete search history.

(56) References Cited

U.S. PATENT DOCUMENTS

| | | |
|---|---|---|
| 2010/0174418 A1 | 7/2010 | Haugh |
| 2014/0148963 A1 | 5/2014 | Ozog |
| 2014/0172503 A1* | 6/2014 | Hammerstrom ....... G05B 15/02 705/7.31 |
| 2015/0188482 A1 | 7/2015 | Berkowitz et al. |
| 2015/0214768 A1 | 7/2015 | Matsuyama et al. |
| 2015/0241893 A1* | 8/2015 | Hajimiragha ........... H02J 3/381 700/297 |
| 2017/0229869 A1 | 8/2017 | Boone et al. |
| 2017/0308968 A1* | 10/2017 | Zhou ......................... H02J 3/14 |
| 2017/0331325 A1* | 11/2017 | Ristau ....................... H02J 3/38 |
| 2017/0372244 A1 | 12/2017 | Westergaard |
| 2021/0376613 A1* | 12/2021 | Cummings ............... H02J 3/32 |

OTHER PUBLICATIONS

Quadracci Sustainable Engineering Lab at Columbia University, "Acacia Irrigation;" Downloaded from https://qsel.columbia.edu/acacia-irrigation-project/; Downloaded on Feb. 24, 2021; 4 pages.
Bizzarri, et al., "Safe Access to Firewood and Alternative Energy in Kenya: An Appraisal Report;" Women's Refugee Commission; Jul. 17, 2010; 52 pages.
U.S. Appl. No. 17/183,865, filed Feb. 24, 2021, MacLaren.
PCT International Search Report and Written Opinion dated May 3, 2021 for International Application No. PCT/2021/019624; 8 pages.
MacLaren, "Water and Power for Africa, Rethinking Community Resource Distribution;" Mar. 22, 2019; 21 pages.
PCT International Search Report and Written Opinion dated Jun. 29, 2021 for International Application No. PCT/US2021/019352; 16 pages.
Restriction Requirement dated Jul. 14, 2022 for U.S. Appl. No. 17/183,865; 10 Pages.
Response to Restriction Required dated Jul. 14, 2022, filed Aug. 15, 2022, for U.S. Appl. No. 17/183,865; 1 Page.
Non-Final Office Action dated Aug. 31, 2022, for U.S. Appl. No. 17/183,865; 20 Pages.
International Preliminary Report on Patentability dated Sep. 6, 2022 for Application No. PCT/2021/019624; 6 pages.

* cited by examiner

PHOTOVOLTAIC GRID CAPACITY SENSOR

CROSS-REFERENCE TO RELATED APPLICATION

This application claims the benefit of and priority to U.S. Provisional Application No. 62/984,398, filed on Mar. 3, 2020, which is herein incorporated by reference in its entirety.

STATEMENT REGARDING FEDERALLY SPONSORED RESEARCH

This invention was made with Government support under FA8702-15-D-0001 awarded by the U.S. Air Force. The Government has certain rights in the invention.

BACKGROUND

The lack of electricity is one of the most pressing concerns in the developing world. Many of the very large number of people in the world that do not have access to electricity resort to biomass cooking to prepare their food. Unfortunately, biomass cooking has severe detrimental impact on the health, environment, climate, and economy of worldwide communities. Today, upwards of four million people die each year from illnesses caused by indoor air pollution from biomass cooking. Also, massive deforestation occurs in countries when large percentage of the countries' population search many hours per day for biomass fuel.

While there is a pressing need to provide access to energy, such as alternative fuels for cooking, current fuel technologies have not been able to service such areas in need or readily accepted by such areas in need. For instance, although cookstove technology for use in the developing world has improved in recent years, cookstove efficiency remains low, the stoves are expensive, and special fuel is required for clean cooking. Other alternative clean burning fuels, such as liquified petroleum gas (LPG), have gained some momentum in these areas but require a large distribution and maintenance infrastructure which many countries are not able to afford at scale.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

The concepts, systems, and techniques described herein are directed toward determining real time capacity of a renewable energy microgrid having a minimal energy buffer. In an embodiment, the renewable energy microgrid includes a photovoltaic (PV) microgrid grid.

In accordance with one example embodiment provided to illustrate the broader concepts, systems, and techniques described herein, a method to determine a capacity of a microgrid may include applying a current test load to the microgrid and measuring a current through an energy storage device, the current indicating a charging status of the energy storage device based on a current load being applied to the microgrid through activated power outlets being served by the microgrid and the current test load, the energy storage device being integrated with the microgrid. The method may also include, responsive to a determination that the measured current based on the current load being applied to the microgrid and the current test load indicates that the energy storage device is discharging, determining the capacity of the microgrid, wherein the capacity is the current load being applied to the microgrid through activated power outlets and a test load applied to the microgrid immediately preceding the current test load.

According to another example embodiment provided to illustrate the broader concepts described herein, a system to determine a capacity of a microgrid includes one or more non-transitory machine-readable mediums configured to store instructions and one or more processors configured to execute the instructions stored on the one or more non-transitory machine-readable mediums. Execution of the instructions causes the one or more processors to apply a current test load to the microgrid and measure a current through an energy storage device, the current indicating a charging status of the energy storage device based on a current load being applied to the microgrid through activated power outlets being served by the microgrid and the current test load, the energy storage device being integrated with the microgrid. Execution of the instructions also causes the one or more processors to, responsive to a determination that the measured current based on the current load being applied to the microgrid and the current test load indicates that the energy storage device is discharging, determine the capacity of the microgrid, wherein the capacity is the current load being applied to the microgrid through activated power outlets and a test load applied to the microgrid immediately preceding the current test load.

According to another example embodiment provided to illustrate the broader concepts described herein, a method to determine a capacity of a microgrid may include applying a test load to the microgrid and measuring a current through an energy storage device, the current indicating a charging status of the energy storage device based on a current load being applied to the microgrid through activated power outlets being served by the microgrid and the test load, the energy storage device being integrated with the microgrid. The method may also include, responsive to a determination that the measured current based on the current load being applied to the microgrid through the activated power outlets being served by the microgrid and the test load indicates that the energy storage device is discharging, determining the capacity of the microgrid.

According to another example embodiment provided to illustrate the broader concepts described herein, a system to determine a capacity of a microgrid includes one or more non-transitory machine-readable mediums configured to store instructions and one or more processors configured to execute the instructions stored on the one or more non-transitory machine-readable mediums. Execution of the instructions causes the one or more processors to apply a test load to the microgrid and measure a current through an energy storage device, the current indicating a charging status of the energy storage device based on a current load being applied to the microgrid through activated power outlets being served by the microgrid and the test load, the energy storage device being integrated with the microgrid. Execution of the instructions also causes the one or more processors to, responsive to a determination that the measured current based on the current load being applied to the microgrid through the activated power outlets being served by the microgrid and the test load indicates that the energy storage device is discharging, determine the capacity of the microgrid.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
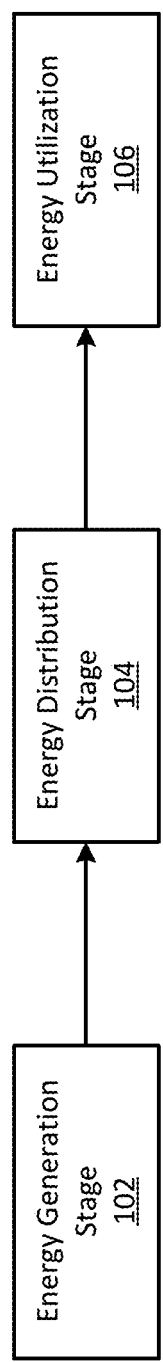
FIG. 1 illustrates an example power management process, in accordance with an embodiment of the present disclosure.

As noted above, there is a need to provide energy to communities in the developing world. A primary issue for advancing any fuel technology in these communities is household adoption and continued use over long periods of time. One factor to adoption and continued use is reliability of the fuel technology. For example, customers need a reliable system and process for using the fuel technology, such as for cooking, or they will discontinue service causing utility operation costs to spiral and be unsustainable. The technology, too, plays an important role of breaking down barriers to adoption by providing tools that make using the technology simple and safe to use.

Power generating sources, such as photovoltaic (PV) microgrid installations, can provide clean, low cost electricity for cooking as well as establish a scalable power infrastructure for these communities. In a PV microgrid, a group of PV panels (solar panels) captures and generates electricity from the sun's light. In order to provide electricity during the periods where there is no sunlight to generate the electricity, PV microgrid systems maintain an energy buffer (e.g., a battery) to store the generated electricity for future use. Although there have been recent cost reductions in PV hardware, the costs associated with PV microgrid installations and maintenance remain prohibitive for these developing countries. Since a relatively large portion of the PV microgrid installation cost is due to the purchase, maintenance, and replacement of the large batteries, cost of a PV microgrid installation can be significantly further reduced by minimizing the need for battery storage. Minimizing the battery storage, however, would cause the PV microgrid to provide electricity only during the day when there is suitable sunlight (e.g., solar day). In the context of cooking, this would require the community to cook much if not all their food (e.g., rice, beans, teas, soups, etc.) during the day. Thus, for electricity to be accepted by a community, a PV microgrid without an energy buffer needs to distribute power in an efficient, reliable, and equitable manner. For instance, if power to a customer is interrupted or ceased while the customer has not finished cooking or otherwise using the power, the customer is likely to lose confidence in the ability of the PV microgrid utility to reliably provide electricity and, in the case of cooking, may return to biomass cooking.

Maximizing the use of available solar energy that fluctuates with weather, time of day, and time of year allows a PV microgrid installation with minimal battery storage to efficiently and reliably provide power. A key factor to the maximization strategy is the ability to determine real time capacity of the PV microgrid. For instance, the PV microgrid utility needs to know that it is safe to activate a customer's service (i.e., provide power to a customer) for use, such as for cooking, without burdening the PV microgrid having minimal battery storage.

Concepts, devices, and techniques are disclosed for determining real time capacity of a renewable energy microgrid, such as a PV microgrid, having a minimal energy buffer (sometimes referred to herein as an "energy storage device"). In some embodiments, real time capacity of a PV microgrid may be determined by monitoring a current into and out of a small amount of battery storage (i.e., minimal storage buffer) integrated into the PV microgrid. Here, the minimal battery storage of the PV microgrid may serve as a real time indicator for solar irradiance conditions. For instance, when a load is applied to the PV microgrid and a measured current indicates that the minimal battery storage is charging (i.e., not sourcing power), this indicates that there is enough irradiance to supply the applied load (i.e., the applied load is being served by the PV microgrid without use of the minimal battery storage) and that there is additional solar energy available for use on the PV microgrid. However, when a load is applied to the PV microgrid and a measured current indicates that the minimal battery storage is discharging (i.e., sourcing power), this is an indication that there is not enough irradiance to supply the desired load and that the minimal battery storage is serving as a stop gap to supply additional power (e.g., the portion of the desired load that the PV microgrid is unable to supply). In cases where the monitoring indicates that there is not enough irradiance to supply a desired load, no additional loads may be added to the PV microgrid as adding the additional loads may generate a brown out condition or black out condition of the PV microgrid utility. In such cases, appropriate loads may be shed from the PV microgrid. These and other advantages, configurations, modifications, and embodiments will be apparent in light of this disclosure.

Although certain embodiments, implementations, and/or examples are described herein in the context of PV microgrids, PV microgrid systems, and/or PV microgrid utilities, it will be appreciated in light of this disclosure that such embodiments, implementations, and/or examples are not restricted as such, but are applicable to renewable energy power sources in the general sense, such as PV panels and wind turbine sources, to name two examples.

As used herein, the terms "PV panel" and "solar panel" refer, in addition to their plain and ordinary meanings, to a grouping of PV cells arranged in a panel arrangement (e.g., a generally planar panel arrangement) for the photovoltaic generation of electricity.

As used herein, the terms "PV array" and "panel array" refer, in addition to their plain and ordinary meaning, to a grouping of solar panels.

Referring now to the figures, FIG. 1 illustrates an example power management process, in accordance with an embodiment of the present disclosure. As shown, the process includes an energy generation stage 102, an energy distribution stage 104, and an energy utilization stage 106. In more detail, energy generation stage 102 entails the use of a power source to generate of power, such as electrical power. For example, the power source can generate electricity for distribution at energy distribution stage 104. The power source may include various types of power generating sources such as renewable energy power sources. Examples of such power sources include PV arrays, wind turbine sources, micro-hydro sources, and generators.

Energy distribution stage 104 entails the collection and distribution of the power generated by the power source technology in energy generation stage 102. For example, in the case of PV arrays generating electrical power (i.e., when energy generation stage 102 comprises one or more PV panels), a PV microgrid utility may collect and deliver the electrical power to its customers. In this regard, the PV microgrid utility includes the electrical infrastructure (e.g., electrical power harvesting technology, transmission lines, cables, wires, distribution boxes, etc.) to deliver the electricity on the PV microgrid to its customers.

In an embodiment, the PV microgrid utility includes a minimal energy buffer, such as a minimal battery (e.g., a small battery pack). In other words, the PV microgrid utility does not employ or utilize an energy buffer that is sufficient for storing the electrical power generated during the solar day for distribution and use during times the PV microgrid is not generating electrical power, such as during nighttime. Although not sufficient for capturing and storing the electrical power for subsequent use, as will be appreciated in light of this disclosure, the minimal energy buffer utilized allows the PV microgrid utility to determine the real time capacity of the PV microgrid.

In an embodiment, the PV microgrid utility delivers electrical power to its customers when there is sufficient electrical power on the PV microgrid. For example, before providing power to a customer, the PV microgrid utility tests the PV microgrid capacity to determine that there is sufficient electrical power on the PV microgrid to service the customer (e.g., provide the maximum power draw expected by servicing the customer). Upon determining that the PV microgrid capacity is sufficient, the PV microgrid utility delivers the electrical power to the customer. If the PV microgrid utility determines that the PV microgrid capacity is insufficient to service the customer, the PV microgrid utility may undertake appropriate actions. For example, the PV microgrid utility may shed any current load that is being served by the PV microgrid utility. Additionally or alternatively, the PV microgrid utility may distribute any available electrical power on the PV microgrid (e.g., the electrical power that is on the microgrid but insufficient to serve a customer or the electrical power that is on the microgrid but not needed to service the customers) for utilization by community services, such as cell phone charging or hot water heating, to provide a couple examples.

In an embodiment, the PV microgrid utility may deliver electrical power to its customers according to a schedule. For example, the PV microgrid utility may specify time slots during the day at which times customers of the PV microgrid utility may schedule to receive service. To receive electrical power, the customers may sign up for a desired time slot or time slots. In an implementation, the specified time slots may be for a sufficient duration to allow for cooking, such as 30 minutes, 40 minutes, 60 minutes, or other suitable time duration. Note that a customer scheduled for service during a particular time slot need not use the provided electrical power for cooking. For instance, the customer may use the provided electrical power for uses other than cooking, such as for powering an electrical appliance. Using such a schedule to service its customers allows the PV microgrid utility to match the real time capacity of the PV microgrid to the scheduled demand. Additionally, the scheduled demand approach also allows the PV microgrid utility to better utilize (and ideally maximize) the electrical power on the PV microgrid while minimizing battery storage.

In an embodiment, the PV microgrid utility may deliver electrical power to its customers according to a priority. For example, electrical power service certain customers, such as hospitals and clinics, to provide a couple examples, may be prioritized over electrical power service to other customers, such as residential customers, and community service uses, such as community cell phone charging stations. Delivering electrical power in a prioritized fashion allows the PV microgrid utility to equitably distribute the available electrical power on the PV microgrid during low capacity, intelligently shed service during insufficient capacity, and/or alert customers of electrical power availability in times of higher capacity.

Energy utilization stage 106 entails the consumption and use of the power distributed by energy distribution stage 104. For example, in the case of power distribution by a PV microgrid utility, energy utilization stage 106 entails the utilization of the electrical power by customers of the PV microgrid utility. In embodiments, such as in embodiments where the PV microgrid utility includes a minimal energy buffer, the electrical power utilization may be during the solar day.

Figure 2:
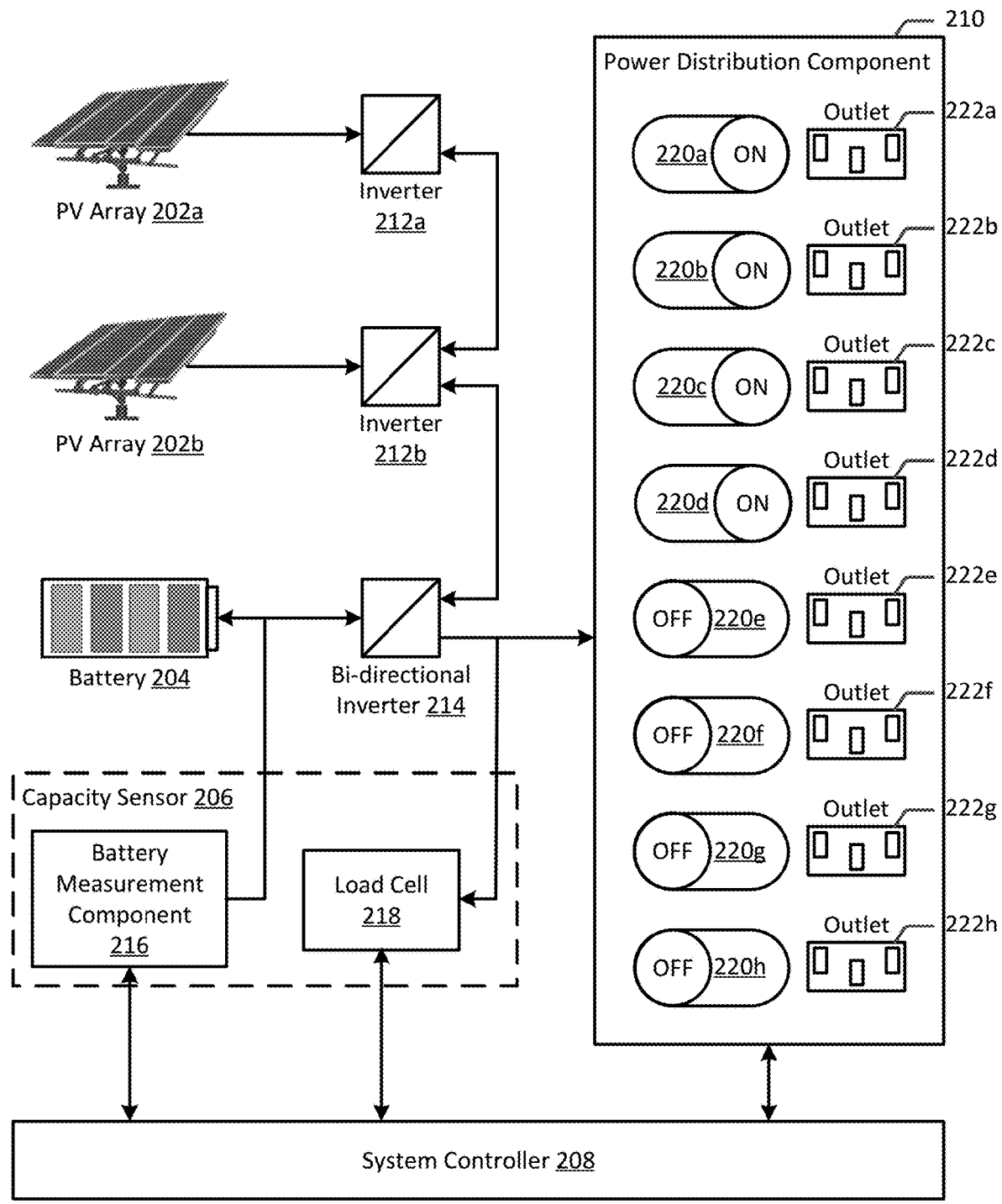
FIG. 2 illustrates an example photovoltaic (PV) microgrid architecture with an integrated load capacity sensor, in accordance with an embodiment of the present disclosure.

FIG. 2 illustrates an example PV microgrid architecture with an integrated load capacity sensor, in accordance with an embodiment of the present disclosure. The PV microgrid architecture may be implemented by a PV microgrid utility to deliver power to its customers. As shown, the architecture includes one or more power sources, such as PV arrays 202a, 202b, a minimal energy buffer, such as a small battery 204 (i.e., a battery having a size/storage capacity which allows a PV microgrid utility to determine the real time capacity of the PV microgrid), a capacity sensor 206, a system controller 208, and a power distribution component 210.

The power sources generate and provide power for the utility. For instance, PV arrays 202a, 202b can generate and provide electrical power for the PV microgrid utility. The number of PV arrays depicted in FIG. 2 is for illustration, and those skilled in the art will appreciate that there may be a different number of PV arrays generating and providing power for the PV microgrid. For example, the PV microgrid may include a smaller number of PV arrays, such as one, or a larger number of PV arrays, such as three, four, five, or more.

The PV arrays are coupled to respective inverters. For example, as shown, PV array 202a is coupled to an inverter 212a and PV array 202b is coupled to an inverter 212b. More particularly, the output of PV array 202a is coupled to an input of inverter 212a and the output of PV array 202b is coupled to an input of inverter 212b. In some embodiments, inverters 212a, 212b are power inverters. Inverter 212a may receive the DC power generated by PV array 202a and convert the DC power to AC power. Similarly, inverter 212b may receive the DC power generated by PV array 202b and convert the DC power to AC power.

The outputs from inverters 212a, 212b are coupled to a bi-directional inverter 214. In some embodiments, bi-directional inverter 214 is a bi-directional power inverter. Bi-directional inverter 214 may draw the converted AC power from inverters 212a, 212b and supply the AC power drawn from inverters 212a, 212b to an AC load, such as power distribution component 210. In an example configuration, the inverter outputs may be in parallel with each other. In this manner, the inverter outputs directly feed the AC distribution.

Battery 204 is coupled to bi-directional inverter 214. As such, battery 204 may be considered as being integrated with the components of the microgrid. Bi-directional inverter 214 may receive DC power from battery 204 and convert the DC power to AC power. Similar to supplying the AC power drawn from inverters 212a, 212b, bi-directional converter 214 may supply the AC power converted from the DC power drawn from battery 204 to the AC load. Because inverter 214 is bi-directional, bi-directional inverter 214 may convert the AC power drawn from inverters 212a, 212b to DC power to charge battery 204. The number of batteries depicted in FIG. 2 is for illustration, and those skilled in the art will appreciate that battery 204 may in fact be multiple batteries (e.g., a battery pack).

As shown in FIG. 2, capacity sensor 206 includes a battery measurement component 216 and a load cell 218. Battery measurement component 216 is coupled to the coupling between battery 204 and bi-directional inverter 214. Battery measurement component 216 may be configured to measure the current into and out of battery 204. Load cell 218 is coupled to the coupling between bi-directional inverter 214 and the AC load. As such, load cell 218 may be configured to apply an AC load to bi-directional inverter 214. In other words, load cell 218 may be configured to draw AC power from bi-directional inverter 214. In some embodiments, load cell 218 may be an escalating load cell (i.e., load cell 218 may be used to apply escalating electrical loads on bi-directional inverter 214).

System controller 208 is coupled to capacity sensor 206 and power distribution component 210. More specifically, system controller 208 may be coupled to battery measurement component 216 and load cell 218 of capacity sensor 206. In some embodiments, system controller 208 is programmed or otherwise configured to monitor the current into and out of battery 204 to determine the real time capacity of the PV microgrid prior to applying a load or increasing an applied load on the PV microgrid. System controller 208 may monitor the current into and out of battery 204 using battery measurement component 216. For example, in an implementation, system controller 208 may use load cell 218 to apply an initial test load on the PV microgrid. System controller 208 may then use battery measurement component 216 to measure the current into and out of battery 204. If the measured current indicates that battery 204 is charging (i.e., not sourcing power), system controller 208 may conclude that there is additional power available for use on the PV microgrid. In this instance, system controller 208 can increase the test load and again measure the current into and out of battery 204. If the measured current indicates that battery 204 is discharging, system controller 208 may conclude that there may not be enough power on the PV microgrid to supply the desired load and battery 204 is serving as a stop gap to supply additional power. In this instance, system controller 208 may determine the capacity of the PV microgrid and, based on the determined capacity, take appropriate action, such as, by way of example, distribute the determined capacity (i.e., additional power) on the PV microgrid to customers or shed the load being currently served by the PV microgrid. For example, system controller 208 may use power distribution component 210 to distribute the power available on the PV microgrid (e.g., apply a load on the PV microgrid). System controller 208 may also use power distribution component 210 to shed the load being currently served by the PV microgrid. System controller 208 is further described below at least in conjunction with FIG. 4.

As described previously, power distribution component 210 is coupled to bi-directional inverter 214. Accordingly, power distribution component 210 may draw power from bi-directional inverter 214. In other words, power distribution component 210 may apply a load on the PV microgrid. As shown, power distribution component includes relays 220a-220h and power outlets 222a-222h. Relay 220a may be a switch for activating power outlet 222a, relay 220b may be a switch for activating power outlet 222b, and so on where relay 220h may be a switch for activating power outlet 222h. For instance, a relay in an "ON" position operates to electrically connect a corresponding power outlet to bi-directional inverter 214 (i.e., a power source). Conversely, a relay in an "OFF" position operates to electrically disconnect a corresponding power outlet from bi-directional inverter 214. As shown in FIG. 2, relays 220a-220d are in the "ON" position and relays 220e-220h are on the "OFF" position. As a result, power outlets 222a-222d are activated (electrically connected to bi-directional inverter 214) and power outlets 220e-220h are not activated (electrically disconnected from bi-directional inverter 214). Because power outlets 222a-222d are activated, power can be drawn through power outlets 222a-222d. In other words, power outlets 222a-222d can be used to apply a load on the PV microgrid. Because power outlets 222e-222h are not activated, power cannot be drawn through power outlets 222e-222h. In other words, power outlets 222e-222h cannot be used to apply a load on the PV microgrid. Accordingly, system controller 208 can apply a load on the PV microgrid by activating a deactivated power outlet (e.g., turning on relay 220e) and shed the load that is currently being service by the PV microgrid by deactivating an activated power outlet (e.g., turning off relay 220d).

Figure 3:
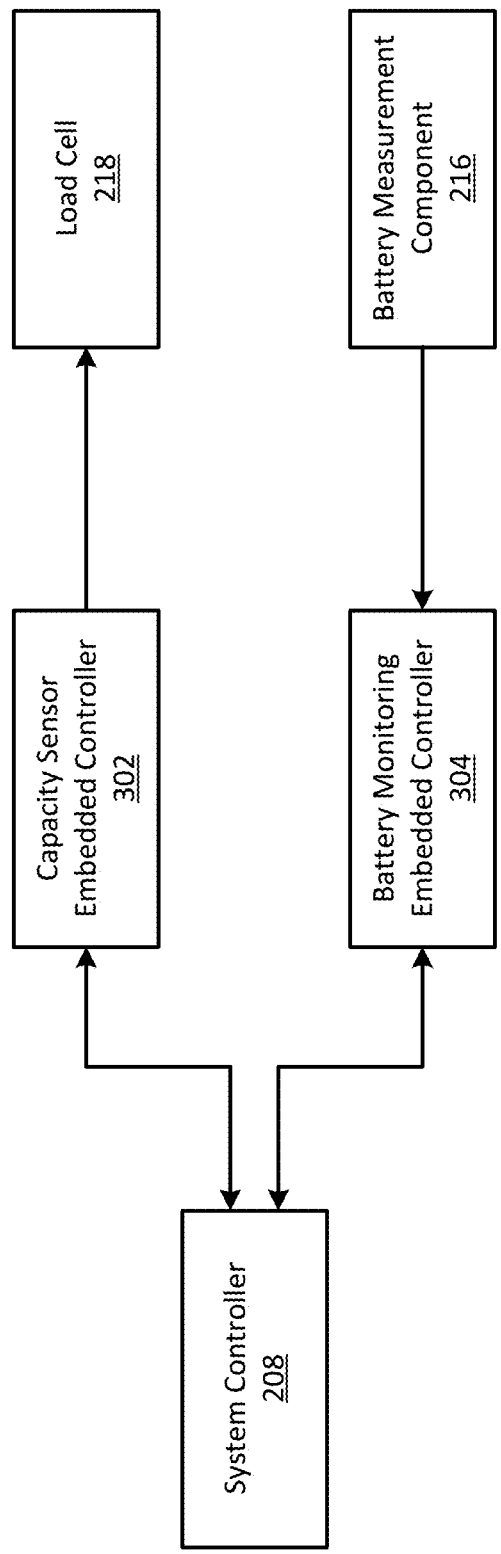
FIG. 3 illustrates an example capacity sensor control architecture, in accordance with an embodiment of the present disclosure.

FIG. 3 illustrates an example capacity sensor control architecture, in accordance with an embodiment of the present disclosure. In the example shown in FIG. 3, the capacity sensor control architecture includes system controller 208 coupled to a capacity sensor embedded controller 302, which is coupled to load cell 218. In embodiments, capacity sensor embedded controller 302 may be programmed or otherwise configured to apply loads to a microgrid, such as the microgrid described above in conjunction with FIGS. 1 and 2. For example, capacity sensor embedded controller 302 may control the operation of load cell 218 (e.g., apply a force to load cell 218 by turning on or turning off one or more resistors) to apply a desired load to the microgrid.

In an example implementation, capacity sensor embedded controller 302 may provide a graphical user interface (GUI), or other suitable interface, that allows a user to apply desired loads to the microgrid. For example, the GUI may provide a user interface element with which the user can select or otherwise specify a desired load (e.g., electrical load) to apply to the microgrid. As another example, the GUI may also provide user interface elements, such as check boxes, that can be checked or otherwise activated to select the resistors or resistor banks to use in applying the specified load. For example, load cell 218 may include multiple resistors or resistor banks that may be used in applying the specified load to the microgrid. The individual resistors or resistor banks may be coupled to a replay. The user may then use the check boxes representing the resistors of load cell 218 to select one or more resistors of load cell 218 which causes capacity sensor embedded controller 302 to turn on the relays coupled to the one or more selected resistors. As still another example, the GUI may also provide user interface elements with which the user can specify a configurable step size and apply incremental loads (e.g., escalating loads) to the microgrid based on the specified step size. In any case, once the inputs relating to a desired load is received, for example, via the GUI, capacity sensor embedded controller 302 may control load cell 218 to apply the specified load (i.e., the input desired load) to the microgrid.

In some example implementations, capacity sensor embedded controller 302 may provide a computing interface, such as an application programming interface (API), that allows a software application (e.g., system controller 208) to interact with capacity sensor embedded controller 302. For example, system controller 28 may use the computing interface to send or otherwise provide to capacity sensor embedded controller 302 instructions to apply a specified load on the microgrid. As described previously, in some implementations, capacity sensor embedded controller 302 may turn on appropriate relays coupled to one or more resistors or resistor banks to activate the resistor or resistor banks to cause load cell 208 to apply the specified load on the microgrid.

Still referring to the capacity sensor control architecture of FIG. 3, as can be seen, system controller 208 is also coupled to a battery monitoring embedded controller 304, which is coupled to battery measurement component 216. In embodiments, battery monitoring embedded controller 304 may be programmed or otherwise configured to monitor the charging status of battery 204 under different loads applied to the microgrid and send or otherwise provide to system controller 208 the monitored charging status information. As described previously, the different loads may be applied to the microgrid using capacity sensor embedded controller 302. In some such embodiments, battery monitoring embedded controller 304 may receive a measure of the current through battery 204 from battery measurement component 216, and send or otherwise provide the measured current (e.g., a current draw from battery 204 measured and provided by battery measurement component 216) to system controller 208. The measured current information provided by battery monitoring embedded controller 304 allows system controller 208 to determine whether additional power may be on the microgrid.

In an example implementation, battery monitoring embedded controller 304 may provide the measured current in response to an inquiry or request. For example, system controller 208 may send to battery monitoring embedded controller 304 a request for a measure of the current that is currently flowing through battery 204. In response to receiving the request, battery monitoring embedded controller 304 may utilize battery measurement component 216 to measure the current that is currently flowing through battery 204 and send or otherwise provide to system controller 208 the measured current as a response to the request. In some implementations, battery monitoring embedded controller 304 may be configured to send or otherwise provide the current information at a constant, predetermined frequency, such as, for example, every 60 seconds (secs), 90 secs, 120 secs, 240 secs, or any other suitable period of time. In such implementations, the frequency may be configurable, for example, by a provider of the microgrid.

Figure 4:
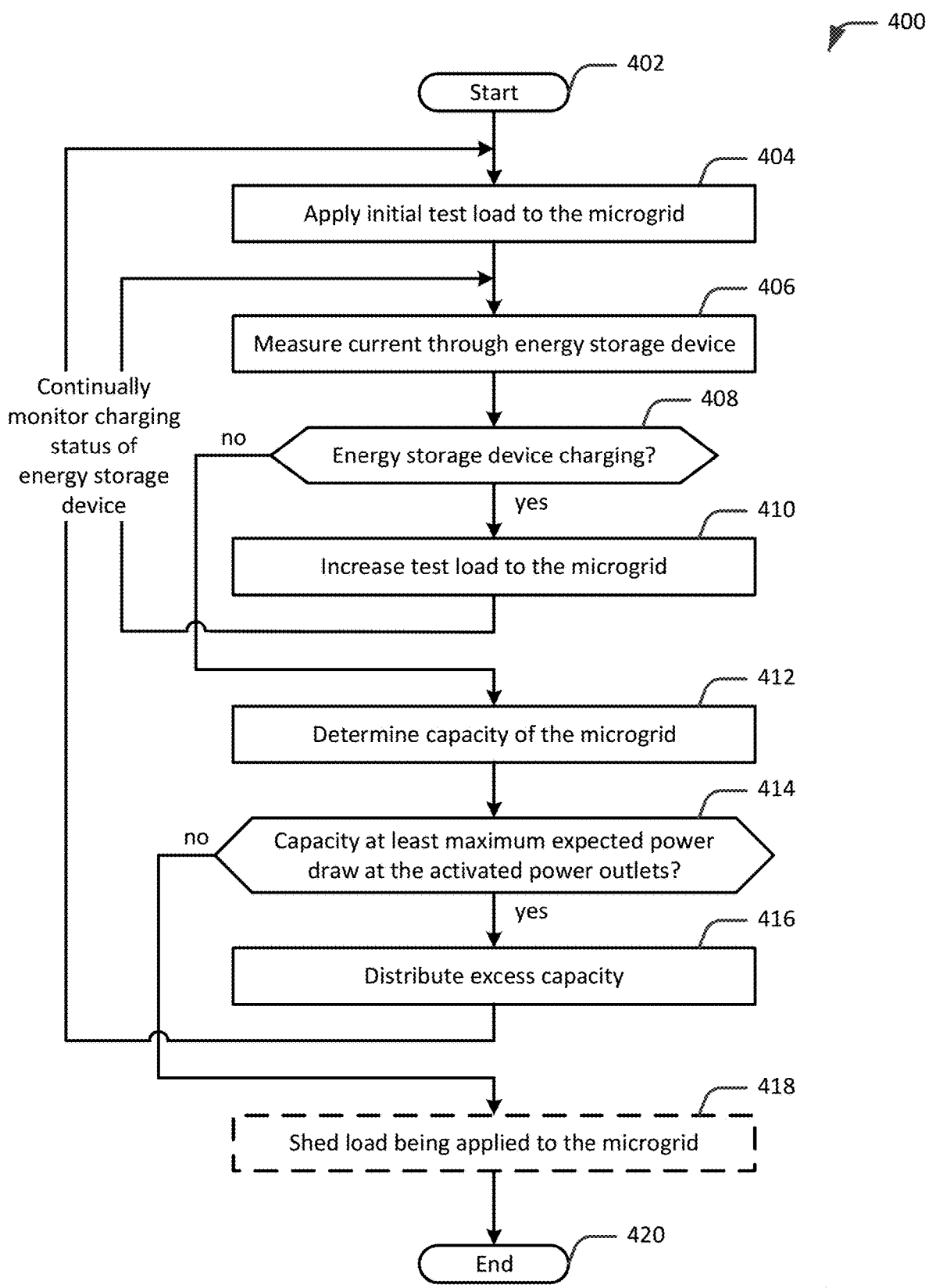
FIG. 4 is a flow diagram illustrating an example process for determining a real time capacity of a photovoltaic (PV) microgrid, in accordance with an embodiment of the present disclosure.

FIG. 4 is a flow diagram of an example process 400 for determining a real time capacity of a photovoltaic (PV) microgrid, in accordance with an embodiment of the present disclosure. For example, process 400 may be implemented within a microgrid system and, more particularly, within a PV microgrid system, such as the illustrative systems described above in conjunction with FIGS. 1-3. Rectangular and hexagonal elements are herein denoted "processing blocks," and represent computer software instructions or groups of instructions. Alternatively, the processing blocks may represent steps or processes performed by functionally equivalent circuits such as a digital signal processor circuit or an application specific integrated circuit (ASIC). The flow diagram does not depict the syntax of any particular programming language, but rather illustrates the functional information one of ordinary skill in the art requires to fabricate circuits or to generate computer software to perform the processing described. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered, meaning that, when possible, the functions represented by the blocks can be performed in any convenient or desirable order.

With reference to FIG. 4, process 400 is initiated at block 402. In an example use case, a PV microgrid controller, such as system controller 208 of FIG. 2, may implement process 400 to determine the capacity of the microgrid prior to providing power to any of the power outlets served by the microgrid to ensure that there is sufficient power on the microgrid to support any load placed on the microgrid. Note that, to allow system controller 208 to determine that the current capacity of the microgrid (power on the microgrid) is sufficient to power a power outlet or power outlets served by the microgrid, system controller 208 is preconfigured with or otherwise made knowledgeable of the maximum power draw that may occur at each of the power outlets (e.g., the maximum expected power draw through the power outlets) if a particular power outlet is activated (i.e., turned on). For example, the maximum power draw that may occur at the power outlets served by the microgrid may be specified by a system administrator (e.g., an authorized user at the PV microgrid utility) and provided in a configuration file that is accessible by system controller 208.

At block 404, system controller 208 may apply an initial test load to the microgrid. For example, system controller 208 may apply the initial test load using load cell 218 of capacity sensor 206. System controller 208 may apply the initial test load and subsequent test loads to detect excesses of microgrid power. In an implementation, the initial test load may be a load that is sufficient to power a power outlet having the least (smallest) expected power draw. For example, the initial test load may be set to 15 watts or any other suitable value that may be sufficient to serve a power outlet for charging an electronic device, such as a cell phone or similar mobile device.

At block 406, system controller 208 may measure the current through an energy storage device, such as battery 204. For example, system controller 208 may measure the current using battery measurement component 216 of capacity sensor 206. The measured current provides an indication of the charging status of battery 204. If the measured current indicates that battery 204 is charging (i.e., not sourcing power), additional power may be on the microgrid in addition to the current load being served by the microgrid through the activated power outlets. The current load is the load that is being drawn through the activated power outlets being served by the microgrid. In other words, the current load is the load being applied to the microgrid by the activated power outlets. The current load is exclusive of any artificial load (i.e., test load) being applied to the microgrid by system controller 208. Note that the current load may not be the same as the maximum power draw that may occur at the activated power outlets. For example, it may be the case that a draw of power, such as a cooking appliance or other electrical appliance, is not plugged into or otherwise connected to an activated power outlet. In other words, no power may be being drawn through an activated power outlet (i.e., an activated power outlet is not being used). It may also be the case that the power being drawn through an activated power outlet may be less than the maximum expected power draw through that power outlet.

For example, system controller 208 can add additional customers by redistributing power allocated for an activated power outlet that is not being used by a first customer to a new customer. If the first customer later decided to actually use the power outlet and system controller 208 determined that there is not enough power on the microgrid for the new customer, system controller 208 can shed the new customer. Alternatively, system controller 208 can delay providing service to the first customer until adequate power is available on the microgrid.

At block 408, system controller 208 checks to determine whether battery 204 is charging under the microgrid's current load condition. The current load condition is the load being drawn through the activated power outlets being served by the microgrid and the test load being applied by system controller 208.

If the measured current through battery 204 indicates that battery 204 is charging, then, at block 410, system controller 208 may increase the test load being applied to the microgrid. For example, system controller 208 may increase the test load using load cell 218 of capacity sensor 206. In an implementation, the test load may be increased by the amount of the initial test load. Incrementing the test load by such small increments (e.g., the amount of the initial test load) allows for detecting small excesses of microgrid power that may be distributed to power outlets being served by the microgrid. In other implementations, the test load may be increased by any desired amount, such as 10 watts, 12 watts, 15 watts, 20 watts, or any other suitable value.

Having increased the test load applied to the microgrid, at block 408, system controller 208 checks to determine whether battery 204 is charging under the microgrid's current load condition (i.e., new load condition). The new load condition is the load being drawn through the activated power outlets being served by the microgrid and the increased test load applied by system controller 208. System controller 208 can continually and/or periodically monitor the charging status of battery 204 under different load conditions (e.g., monitor the energy storage device under incremental test loads) to determine the real time capacity of the microgrid.

Otherwise, if the measured current through battery 204 indicates that battery 204 is discharging, then, at block 412, system controller 208 can determine the capacity of the microgrid. In this case, the capacity of the microgrid is the load being drawn through the activated power outlets being served by the microgrid and the test load immediately preceding the current test load applied by system controller 208. For example, suppose system controller 208 applied an initial test load of 15 watts and, based on a determination that battery 204 is charging, increased the initial test load (e.g., incremented the test load) by another 15 watts for a total test load of 30 watts. In this example, the current test load applied by system controller 208 is 30 watts and the immediately preceding test load (i.e., the test load immediately preceding the current test load) applied by system controller 208 is 15 watts.

Having determined the capacity of the microgrid, at block 414, system controller 208 may check to determine whether the capacity of the microgrid is at least the maximum expected power draw at the activated power outlets being served by the microgrid. If the capacity of the microgrid is at least the maximum expected power draw at the activated power outlets being served by the microgrid, system controller 208 may conclude that there is additional power on the microgrid (i.e., excess capacity). The additional or excess power is the power on the microgrid in excess of the maximum expected power draw at the activated power outlets being served by the microgrid.

If system controller 208 determines that there is excess capacity on the microgrid (that the capacity of the microgrid is at least the maximum expected power draw at the activated power outlets being served by the microgrid), then, at block 416, system controller 208 checks to determine whether the excess capacity on the microgrid is at least a maximum expected power draw through an inactive power outlet being served by the microgrid. In other words, the check performed is to determine whether the additional power on the microgrid is sufficient to power an inactive power outlet associated with a customer of the microgrid utility, such as a power outlet for providing power to an electrical appliance such as a rice cooker, a slow cooker, a cooking appliance, a water heater, an area heater, a cooling appliance such as a refrigerator, lighting appliance, a water pump, a cell phone, or a computer, to provide a few examples. If the excess capacity is sufficient to provide power to the inactive power outlet, system controller 208 can activate the inactive power outlet. Note that the excess capacity may be sufficient to power multiple inactive power outlets that are being served by the microgrid. In this instance, system controller 208 can activate the multiple inactive power outlets using the excess capacity on the microgrid. If the excess capacity is insufficient to power an inactive power outlet associated with a customer of the microgrid utility, system controller 208 may check to determine whether the excess capacity on the microgrid is sufficient to power an inactive power outlet whose maximum expected power draw is less than that of an inactive power outlet that cannot be sufficiently powered using the excess capacity. Nonlimiting examples of such power outlets having a smaller maximum expected power draw relative to "normal" power outlets for connecting electrical power appliances include a USB outlet and outlets for charging cell phones, radios, computing devices, and lights. In this manner, system controller 208 may distribute the additional power that is on the microgrid. In some cases, system controller 208 may distribute the additional power on the microgrid to power outlets for use by the community being serviced by the microgrid utility. Having appropriately distributed the excess capacity of the microgrid, at block 404, system controller 208 may apply an initial test load to the microgrid and proceed to again determine the capacity of the microgrid.

Otherwise, if system controller 208 determines that there is no excess power on the microgrid (the capacity of the microgrid is less than the maximum expected power draw at the activated power outlets being served by the microgrid), then, at block 418, system controller 208 can optionally shed the load being served by the microgrid. Here, the load being served by the microgrid is the maximum expected power draw through the activated power outlets being served by the microgrid. For example, in an implementation, system controller 208 can deactivate an activated power outlet being served by the microgrid. System controller 208 may deactivate an activated power outlet based on a priority associated with the power outlets being served by the microgrid. In some cases, system controller 208 may deactivate an activated power outlet that is for use by the community being serviced by the microgrid utility. In any case, system controller 208 may appropriately shed the load that is currently being served by the microgrid.

In some implementations, system controller 208 may shed the load based on the measured current through battery 204. In other words, the microgrid utility can shed its service (i.e., the load that is currently being served by the microgrid) based on the measured energy draw from battery 204. For example, if the measured energy draw is about 15 W, system controller 208 may shed service to (i.e., stop serving) a cell phone charging outlet. If the measured energy draw is about 60 W, system controller 208 may shed service to a power outlet for connecting a computing device. If the measured energy draw is about 450 W, system controller 208 may shed service to a power outlet for connecting an electrical appliance, such as a cooking appliance. In some embodiments, system controller 208 may shed service according to a priority.

Having appropriately shed the load currently being served by the microgrid, process 400 may end at block 420.

Figure 5:
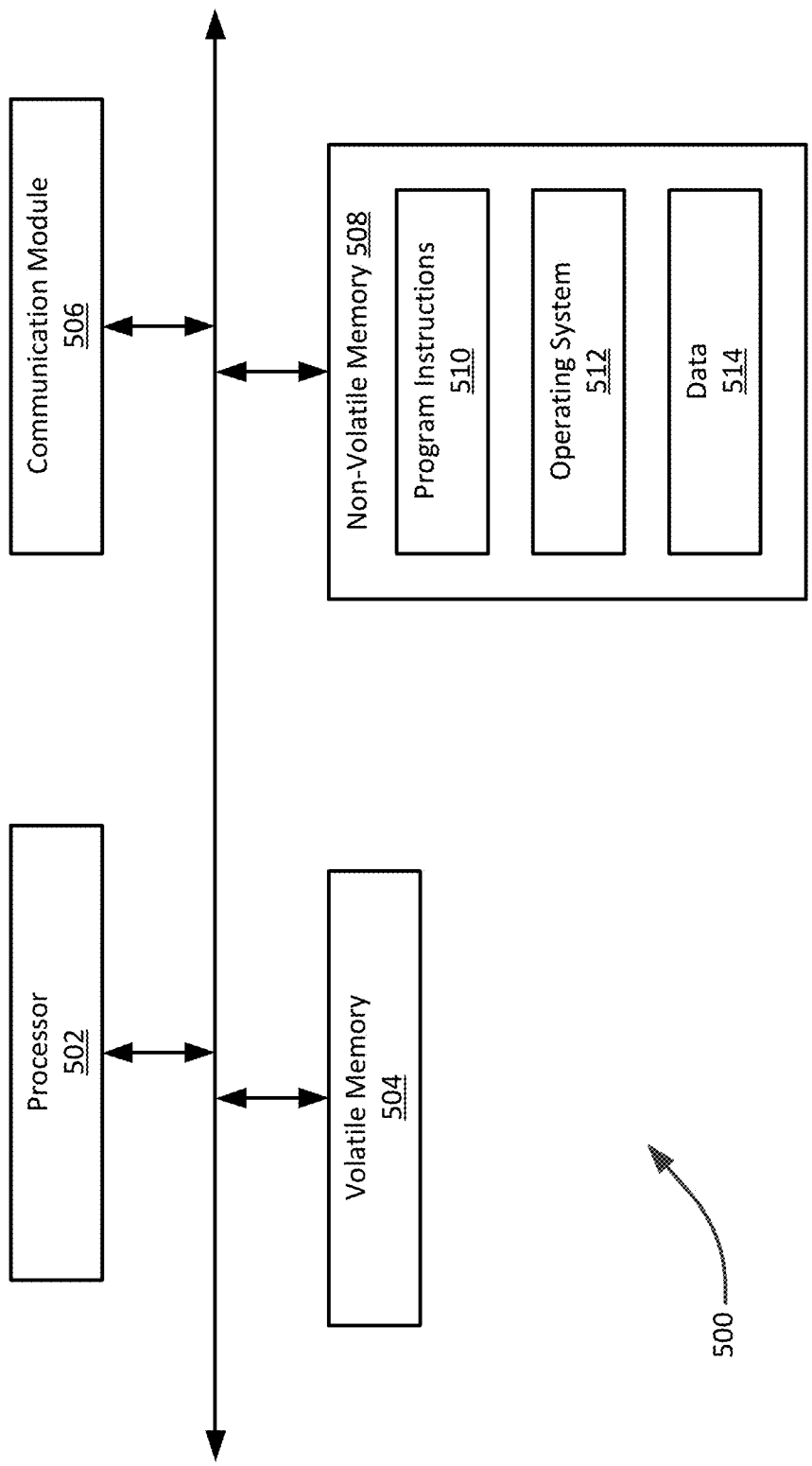
FIG. 5 is a block diagram illustrating selective components of an example computing device in which various aspects of the disclosure may be implemented, in accordance with an embodiment of the present disclosure.

FIG. 5 is a block diagram illustrating selective components of an example computing device 500 in which various aspects of the disclosure may be implemented, in accordance with an embodiment of the present disclosure. In some embodiments, computing device 500 may be configured to implement or direct one or more operations associated with some or all of the components and/or modules associated with system controller 208 of FIG. 2. In one example case, for instance, each of the processes and/or operations performed by system controller 208 as described herein may be stored on a non-volatile memory 508 (e.g., a hard disk), loaded in a volatile memory 504 (e.g., random access memory (RAM)), and executable by a processor 502. However, the illustrated computing device 500 is shown merely as an example and one skilled in the art will appreciate that system controller 208 of FIG. 2 may be implemented by any computing or processing environment and with any type of machine or set of machines that may have suitable hardware and/or software capable of operating as described herein.

As shown in FIG. 5, computing device 500 includes processor 502, volatile memory 504 (e.g., random access memory (RAM)), a communication module 506, and non-volatile memory 508. Processor 502, volatile memory 504, communication module 506, and non-volatile memory 508 may be communicatively coupled. In various embodiments, additional components (not illustrated, such as a display, communication interface, input/output interface, etc.) or a subset of the illustrated components can be employed without deviating from the scope of the present disclosure.

Non-volatile memory 508 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

Non-volatile memory 508 stores program instructions 510, an operating system 512, and data 514 such that, for example, computer instructions of operating system 512 and/or program instructions 510 are executed by processor 502 out of volatile memory 504. For example, in some embodiments, program instructions 510 and data 514 may cause computing device 500 to implement functionality in accordance with the various embodiments and/or examples with respect to system controller 208 of FIG. 2 described herein. In some embodiments, volatile memory 504 may include one or more types of RAM and/or a cache memory that may offer a faster response time than a main memory.

Processor 502 may be implemented by one or more programmable processors to execute one or more executable instructions, such as program instructions 510 and/or a computer program, to perform or direct performance of any number of operations described in the present disclosure. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, processor 502 can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. Processor 502 may be analog, digital or mixed signal. In some embodiments, processor 502 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communication module 506 can be any appropriate network chip or chipset which allows for wired or wireless communication via a network, such as, by way of example, a local area network (e.g., a home-based or office network), a wide area network (e.g., the Internet), a peer-to-peer network (e.g., a Bluetooth connection), or a combination of such networks, whether public, private, or both. Communication module 506 can also be configured to provide intra-device communications via a bus or an interconnect.

Further Illustrative Embodiments

Example 1 includes a method to determine a capacity of a microgrid, the method including: applying a current test load to the microgrid; measuring a current through an energy storage device, the current indicating a charging status of the energy storage device based on a current load being applied to the microgrid through activated power outlets being served by the microgrid and the current test load, the energy storage device being integrated with the microgrid; and, responsive to a determination that the measured current based on the current load being applied to the microgrid and the current test load indicates that the energy storage device is discharging, determining the capacity of the microgrid, wherein the capacity is the current load being applied to the microgrid through activated power outlets and a test load applied to the microgrid immediately preceding the current test load.

Example 2 includes the subject matter of Example 1, further including, responsive to a determination that the measured current based on the current load being applied to the microgrid and the current test load indicates that the energy storage device is charging, applying an increased test load to the microgrid, the increased test load being an increase over the current test load.

Example 3 includes the subject matter of Example 2, further including, responsive to a determination that the measured current based on the current load being applied to the microgrid and the increased test load indicates that the energy storage device is discharging, determining the capacity of the microgrid, wherein the capacity is the current load being applied to the microgrid and the current test load that immediately preceded the increased test load.

Example 4 includes the subject matter of Example 3, further including, responsive to a determination that the determined capacity of the microgrid is less than an expected maximum power draw through the activated power outlets, shedding a load being served by the microgrid, wherein the load being served by the microgrid is the expected maximum power draw through the activated power outlets.

Example 5 includes the subject matter of Example 4, wherein shedding the load being served by the microgrid includes deactivating an activated power outlet.

Example 6 includes the subject matter of Example 4, wherein shedding the load being served by the microgrid includes deactivating an active Universal Serial Bus (USB) outlet.

Example 7 includes the subject matter of any of Examples 1 through 6, further including, responsive to a determination that the determined capacity of the microgrid is less than an expected maximum power draw through the activated power outlets, shedding a load being served by the microgrid.

Example 8 includes the subject matter of Example 7, wherein shedding the load being served by the microgrid includes deactivating an activated power outlet.

Example 9 includes the subject matter of Example 8, wherein deactivating an activated power outlet is based on a priority.

Example 10 includes the subject matter of Example 7, wherein shedding the load being served by the microgrid includes deactivating an activated power outlet that is not drawing power.

Example 11 includes the subject matter of Example 7, wherein shedding the load being served by the microgrid includes deactivating an active Universal Serial Bus (USB) outlet.

Example 12 includes the subject matter of any of Examples 1 through 11, further including, responsive to a determination that the determined capacity of the microgrid is at least an expected maximum power draw through the activated power outlets, determining an excess capacity of the microgrid, wherein the excess capacity is the capacity of the microgrid in excess of an expected maximum power draw through the activated power outlets; and, responsive to a determination that the excess capacity is at least a maximum expected power draw through the inactive power outlet, activating the inactive power outlet.

Example 13 includes the subject matter of any of Examples 1 through 12, wherein the microgrid is a photovoltaic (PV) microgrid.

Example 14 includes a system to determine a capacity of a microgrid including one or more non-transitory machine-readable mediums configured to store instructions and one or more processors configured to execute the instructions stored on the one or more non-transitory machine-readable mediums. Execution of the instructions causes the one or more processors to: apply a current test load to the microgrid; measure a current through an energy storage device, the current indicating a charging status of the energy storage device based on a current load being applied to the microgrid through activated power outlets being served by the microgrid and the current test load, the energy storage device being integrated with the microgrid; and, responsive to a determination that the measured current based on the current load being applied to the microgrid and the current test load indicates that the energy storage device is discharging, determine the capacity of the microgrid, wherein the capacity is the current load being applied to the microgrid through activated power outlets and a test load applied to the microgrid immediately preceding the current test load.

Example 15 includes the subject matter of Example 14, wherein execution of the instructions causes the one or more processors to, responsive to a determination that the measured current based on the current load being applied to the microgrid and the current test load indicates that the energy storage device is charging, apply an increased test load to the microgrid, the increased test load being an increase over the current test load.

Example 16 includes the subject matter of Example 15, wherein execution of the instructions causes the one or more processors to, responsive to a determination that the measured current based on the current load being applied to the microgrid and the increased test load indicates that the energy storage device is discharging, determine the capacity of the microgrid, wherein the capacity is the current load being applied to the microgrid and the current test load that immediately preceded the increased test load.

Example 17 includes the subject matter of Example 16, wherein execution of the instructions causes the one or more processors to, responsive to a determination that the determined capacity of the microgrid is less than an expected maximum power draw through the activated power outlets, shed a load being served by the microgrid, wherein the load being served by the microgrid is the expected maximum power draw through the activated power outlets.

Example 18 includes the subject matter of Example 17, wherein to shed the load being served by the microgrid includes to deactivate an activated power outlet.

Example 19 includes the subject matter of Example 17, wherein to shed the load being served by the microgrid includes to deactivate an active Universal Serial Bus (USB) outlet.

Example 20 includes the subject matter of any of Examples 14 through 19, wherein execution of the instructions causes the one or more processors to, responsive to a determination that the determined capacity of the microgrid is less than an expected maximum power draw through the activated power outlets, shedding a load being served by the microgrid.

Example 21 includes the subject matter of Example 20, wherein to shed the load being served by the microgrid includes to deactivate an activated power outlet.

Example 22 includes the subject matter of Example 21, wherein to deactivate an activated power outlet is based on a priority.

Example 23 includes the subject matter of Example 20, wherein to shed the load being served by the microgrid includes to deactivate an activated power outlet that is not drawing power.

Example 24 includes the subject matter of Example 20, wherein to shed the load being served by the microgrid includes to deactivate an active Universal Serial Bus (USB) outlet.

Example 25 includes the subject matter of any of Examples 14 through 24, wherein execution of the instructions causes the one or more processors to, responsive to a determination that the determined capacity of the microgrid is at least an expected maximum power draw through the activated power outlets, determine an excess capacity of the microgrid, wherein the excess capacity is the capacity of the microgrid in excess of an expected maximum power draw through the activated power outlets; and, responsive to a determination that the excess capacity is at least a maximum expected power draw through the inactive power outlet, activate the inactive power outlet.

Example 26 includes the subject matter of any of Examples 14 through 25, wherein the microgrid is a photovoltaic (PV) microgrid.

Example 27 includes a method to determine a capacity of a microgrid, the method including: applying a test load to the microgrid; measuring a current through an energy storage device, the current indicating a charging status of the energy storage device based on a current load being applied to the microgrid through activated power outlets being served by the microgrid and the test load, the energy storage device being integrated with the microgrid; and, responsive to a determination that the measured current based on the current load being applied to the microgrid through the activated power outlets being served by the microgrid and the test load indicates that the energy storage device is discharging, determining the capacity of the microgrid.

Example 28 includes the subject matter of Example 27, further including, responsive to a determination that the measured current based on the current load being applied to the microgrid and the test load indicates that the energy storage device is charging, increasing the test load that is being applied to the microgrid.

Example 29 includes a system to determine a capacity of a microgrid including one or more non-transitory machine-readable mediums configured to store instructions and one or more processors configured to execute the instructions stored on the one or more non-transitory machine-readable mediums. Execution of the instructions causes the one or more processors to: apply a test load to the microgrid; measure a current through an energy storage device, the current indicating a charging status of the energy storage device based on a current load being applied to the microgrid through activated power outlets being served by the microgrid and the test load, the energy storage device being integrated with the microgrid; and, responsive to a determination that the measured current based on the current load being applied to the microgrid through the activated power outlets being served by the microgrid and the test load indicates that the energy storage device is discharging, determine the capacity of the microgrid.

Example 30 includes the subject matter of Example 29, wherein execution of the instructions causes the one or more processors to, responsive to a determination that the measured current based on the current load being applied to the microgrid and the test load indicates that the energy storage device is charging, increase the test load that is being applied to the microgrid.

The processes described herein are not limited to use with hardware and software of computing device 500 of FIG. 5. Rather, the processes may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or another article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product (e.g., in a non-transitory machine-readable storage medium such as, for example, a non-transitory computer-readable medium) for execution by, or to control the execution of, data processing apparatus (e.g., a programmable processor, a computer, or multiple computers). Each such program may be implemented in a high-level procedural, functional, or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed one computer or multiple computers at one site or distributed across multiple sites and interconnected by a communication network. A computer program may be stored on a non-transitory machine-readable medium or device that is readable by a general or special purpose programmable computer for configuring and operating the computer when the non-transitory machine-readable medium or device is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disk, flash memory, non-volatile memory, volatile memory, magnetic diskette, and so forth but does not include a transitory signal per se.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Various embodiments of the concepts, systems, devices, structures and techniques sought to be protected are described herein with reference to the related drawings. Alternative embodiments can be devised without departing from the scope of the concepts, systems, devices, structures and techniques described herein. It is noted that various connections and positional relationships (e.g., over, below, adjacent, etc.) are set forth between elements in the following description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As used herein, the terms "comprises," "comprising, "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection".

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A system to determine a capacity of a microgrid, the system comprising:
   one or more non-transitory machine-readable mediums configured to store instructions; and
   one or more processors configured to execute the instructions stored on the one or more non-transitory machine-readable mediums, wherein execution of the instructions causes the one or more processors to:
   apply a current test load to the microgrid;
   measure a current through an energy storage device, the current indicating a charging status of the energy storage device based on a current load being applied to the microgrid through activated power outlets being served by the microgrid and the current test load, the energy storage device being integrated with the microgrid;

responsive to a determination that the measured current based on the current load being applied to the microgrid and the current test load indicates that the energy storage device is discharging, determine the capacity of the microgrid, wherein the capacity is the current load being applied to the microgrid through activated power outlets and a test load applied to the microgrid immediately preceding the current test load; and responsive to a determination that the determined capacity of the microgrid is less than an expected maximum power draw through the activated power outlets, shed a load being served by the microgrid.

2. The system of claim 1, wherein execution of the instructions causes the one or more processors to, responsive to a determination that the measured current based on the current load being applied to the microgrid and the current test load indicates that the energy storage device is charging, apply an increased test load to the microgrid, the increased test load being an increase over the current test load.

3. The system of claim 2, wherein execution of the instructions causes the one or more processors to, responsive to a determination that the measured current based on the current load being applied to the microgrid and the increased test load indicates that the energy storage device is discharging, determine the capacity of the microgrid, wherein the capacity is the current load being applied to the microgrid and the current test load that immediately preceded the increased test load.

4. A non-transitory machine-readable medium encoding instructions that when executed by one or more processors cause a process to be carried out to determine a capacity of a microgrid, the process comprising:

applying a test load to the microgrid;

measuring a current through an energy storage device, the current indicating a charging status of the energy storage device based on a current load being applied to the microgrid through activated power outlets being served by the microgrid and the test load, the energy storage device being integrated with the microgrid;

responsive to a determination that the measured current based on the current load being applied to the microgrid through the activated power outlets being served by the microgrid and the test load indicates that the energy storage device is discharging, determining the capacity of the microgrid; and responsive to a determination that the determined capacity of the microgrid is less than an expected maximum power draw through the activated power outlets, shedding a load being served by the microgrid.

5. The machine-readable medium of claim 4, further comprising, responsive to a determination that the measured current based on the current load being applied to the microgrid and the test load indicates that the energy storage device is charging, increasing the test load that is being applied to the microgrid.

6. A method to determine a capacity of a microgrid, the method comprising:

applying a current test load to the microgrid;

measuring a current through an energy storage device, the current indicating a charging status of the energy storage device based on a current load being applied to the microgrid through activated power outlets being served by the microgrid and the current test load, the energy storage device being integrated with the microgrid;

responsive to a determination that the measured current based on the current load being applied to the microgrid and the current test load indicates that the energy storage device is discharging, determining the capacity of the microgrid, wherein the capacity is the current load being applied to the microgrid through activated power outlets and a test load applied to the microgrid immediately preceding the current test load; and responsive to a determination that the determined capacity of the microgrid is less than an expected maximum power draw through the activated power outlets, shedding a load being served by the microgrid.

7. The method of claim 6, further comprising, responsive to a determination that the measured current based on the current load being applied to the microgrid and the current test load indicates that the energy storage device is charging, applying an increased test load to the microgrid, the increased test load being an increase over the current test load.

8. The method of claim 7, further comprising, responsive to a determination that the measured current based on the current load being applied to the microgrid and the increased test load indicates that the energy storage device is discharging, determining the capacity of the microgrid, wherein the capacity is the current load being applied to the microgrid and the current test load that immediately preceded the increased test load.

9. The method of claim 6, wherein shedding the load being served by the microgrid includes deactivating an activated power outlet.

10. The method of claim 9, wherein deactivating an activated power outlet is based on a priority.

11. The method of claim 6, wherein shedding the load being served by the microgrid includes deactivating an activated power outlet that is not drawing power.

12. The method of claim 6, wherein shedding the load being served by the microgrid includes deactivating an active Universal Serial Bus (USB) outlet.

13. The method of claim 6, further comprising:

responsive to a determination that the determined capacity of the microgrid is at least the expected maximum power draw through the activated power outlets, determining an excess capacity of the microgrid, wherein the excess capacity is the capacity of the microgrid in excess of the expected maximum power draw through the activated power outlets; and responsive to a determination that the excess capacity is at least a maximum expected power draw through an inactive power outlet, activating the inactive power outlet.

14. The method of claim 6, wherein the microgrid is a photovoltaic (PV) microgrid.

* * * * *